(12) United States Patent
Kurashige et al.

(10) Patent No.: US 9,154,756 B2
(45) Date of Patent: Oct. 6, 2015

(54) PROJECTION APPARATUS AND HOLOGRAM RECORDING MEDIUM

(71) Applicant: DAI NIPPON PRINTING CO., LTD., Tokyo (JP)

(72) Inventors: Makio Kurashige, Tokyo (JP); Yukio Taniguchi, Tokyo (JP); Ryohei Oka, Tokyo (JP); Kazutoshi Ishida, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 14/344,762

(22) PCT Filed: Sep. 18, 2012

(86) PCT No.: PCT/JP2012/073796
§ 371 (c)(1),
(2) Date: Mar. 13, 2014

(87) PCT Pub. No.: WO2013/039245
PCT Pub. Date: Mar. 21, 2013

(65) Prior Publication Data
US 2014/0340651 A1    Nov. 20, 2014

(30) Foreign Application Priority Data

Sep. 16, 2011    (JP) ................. 2011-203535

(51) Int. Cl.
*G03B 21/28*        (2006.01)
*H04N 9/31*         (2006.01)
(Continued)

(52) U.S. Cl.
CPC .............. *H04N 9/3197* (2013.01); *G02B 5/32* (2013.01); *G02B 27/48* (2013.01); *G03B 21/147* (2013.01); *G03H 1/32* (2013.01); *G03H 2001/2292* (2013.01)

(58) Field of Classification Search
CPC ... G02B 27/48; G02B 27/0663; H04N 9/3197
USPC .......... 353/20, 30, 31, 37, 38, 70, 97, 98, 99;
359/15, 483.01, 489.01, 489.07
See application file for complete search history.

(56) References Cited

U.S. PATENT DOCUMENTS 5,313,479 A     5/1994  Florence
6,607,280 B2 *  8/2003  Koyama et al. ............... 362/601
(Continued)

FOREIGN PATENT DOCUMENTS

JP     06-208089 A1    7/1994
JP     08-108793 A1    4/1996
(Continued)

OTHER PUBLICATIONS

Joseph W. Goodman, "*Speckle Phenomena in Optics*," Roberts & Company, 2006.
(Continued)

*Primary Examiner* — Sultan Chowdhury
(74) *Attorney, Agent, or Firm* — Burr & Brown, PLLC

(57) ABSTRACT

A projection apparatus has a hologram recording medium configured to be capable of diffusing coherent light beams, an irradiation unit configured to irradiate coherent light beams to the hologram recording medium so that the coherent light beams scan the hologram recording medium, a light modulator that is illuminated by coherent light beams incident on and diffused at respective points of the hologram recording medium from the irradiation unit, a projection optical system configured to project a modulated image generated by the light modulator onto a scattering plane, and an imaging optical system provided between the hologram recording medium and the light modulator, configured to converge the coherent light beams diffused at respective points of the hologram recording medium to illuminate the light modulator.

14 Claims, 4 Drawing Sheets

(51) Int. Cl.
*G02B 5/32* (2006.01)
*G03H 1/32* (2006.01)
*G02B 27/48* (2006.01)
*G03B 21/14* (2006.01)
*G03H 1/22* (2006.01)

(56) References Cited

U.S. PATENT DOCUMENTS

| | | | |
|---|---|---|---|
| 2002/0071472 A1* | 6/2002 | Dickson et al. | 372/102 |
| 2003/0039036 A1* | 2/2003 | Kruschwitz et al. | 359/707 |
| 2006/0033009 A1* | 2/2006 | Kobayashi et al. | 250/208.1 |
| 2008/0247022 A1 | 10/2008 | Yamauchi et al. | |
| 2009/0021801 A1* | 1/2009 | Ishihara | 358/475 |
| 2009/0161072 A1* | 6/2009 | Yamauchi et al. | 353/20 |
| 2010/0020291 A1 | 1/2010 | Kasazumi et al. | |
| 2010/0053565 A1* | 3/2010 | Mizushima et al. | 353/38 |
| 2011/0188102 A1 | 8/2011 | Shirakura et al. | |

FOREIGN PATENT DOCUMENTS

| | | |
|---|---|---|
| JP | 2000-352678 A1 | 12/2000 |
| JP | 2008-224760 | 9/2008 |
| JP | 2008-256824 A1 | 10/2008 |
| JP | 2011-158788 A1 | 8/2011 |
| WO | 2006/137326 A1 | 12/2006 |

OTHER PUBLICATIONS

International Search Report dated Dec. 11, 2012.

* cited by examiner

PROJECTION APPARATUS AND HOLOGRAM RECORDING MEDIUM

BACKGROUND OF THE INVENTION

1. Field of the Invention

The present invention relates to a projection apparatus using a light source for emitting coherent light beams and a hologram recording medium.

2. Description of the Related Art

It is important for optical projection apparatuses (projectors) to uniformly illuminate a screen with light radiated from a light source. As methods for realizing uniform illumination of a screen, a 3-panel liquid crystal system using fly-eye lenses, an integrator-rod system for DMD (Digital Micromirror Device), etc. have been proposed.

However, in these systems, there is a problem in that restrictions on optical arrangements determined according to the focal distances of lenses of these systems are very severe in order to obtain rectangular illumination in accordance with the shape of a liquid crystal display, because design freedom is low and a large number of parts are necessary.

Moreover, the integrator-rod system requires a clean rod end face because an image due to dust, a scratch, etc., on the rod end face is formed on a micro display.

Generally, in optical projectors, a spatial light modulator such as a liquid crystal display is illuminated using an illumination device having a white light source such as a high pressure mercury lamp to obtain a modulated image, and the obtained modulated image is magnified and projected onto a screen through lenses.

However, high intensity discharge lamps such as high pressure mercury lamps have a relatively short lifecycle and when they are used for optical projectors or the like, they need to be frequently replaced. In order to cope with such problems, a system using a coherent light source such as a laser has also been proposed. For example, semiconductor lasers which have been widely used in industries have a very long lifecycle in comparison with high intensity discharge lamps such as high pressure mercury lamps. In addition, since semiconductor lasers are capable of generating light of a single wavelength, a color separation apparatus such as a dichroic mirror is unnecessary, so that there is an advantage in that the entire system becomes smaller.

However, in the system using a coherent light source of laser beams or the like, there is a new problem in that speckle is generated. Speckle is a spotted pattern which is formed when a coherent light beam such as a laser beam is emitted to a scattering plane. If speckle is generated on a screen, they are observed as spotted luminance unevenness, i.e. brightness unevenness, thus becoming a factor of having physiologically adverse affect on an observer. It is considered that the reason why speckle is generated in the case of using coherent light beams is that coherent light beams reflected from respective portions of a scattering and reflecting plane such as a screen have very high coherency so that coherent light beams interfere with one another to generate speckles. For example, a theoretical review of the generation of speckles is made in detail in Speckle Phenomena in Optics, Joseph W. Goodman, Roberts & Co., 2006.

As discussed above, there is a problem about speckle which is coherent nature of laser light source. Therefore, techniques for suppressing the generation of speckle have been proposed. For example, Japanese Patent Laid-Open No. 6-208089 discloses a technique in which a laser beam is emitted to a scattering plate, scattered light beams obtained therefrom are guided to a spatial light modulator, and the scattering plate is driven to rotate by a motor, thus reducing speckles.

SUMMARY OF THE INVENTION

As described above, with respect to projection apparatuses using a coherent light source, techniques for reducing speckle have been proposed, however, the techniques proposed so far cannot effectively and sufficiently suppress the generation of speckle. For example, according to the method disclosed in Japanese Patent Laid-Open No. 6-208089 described above, laser beams irradiated to a scattering plate are scattered. Therefore, part of the laser beams is inevitably lost with no contribution to image display. In addition, a scattering plate needs to be rotated in order to reduce speckles. However, such a mechanical rotation mechanism becomes a relatively large apparatus, and power consumption is increased. Moreover, even if the scattering plate is rotated, the position of the optical axis of an illumination light beam is not changed, hence it is impossible to sufficiently suppress the generation of speckle caused by the diffusion on a screen.

Coherent light beams, for example laser beams as a typical example, exhibit excellent straightness and can emit a light of extremely high energy density. Therefore, illumination devices actually developed are preferable to design the optical path of coherent light beams in accordance with the characteristics of coherent light beams.

The inventors have extensively researched under consideration of the points discussed above, and as a result, the inventors have contrived the invention regarding a projection apparatus for projecting a modulated image created by a light modulator while the light modulator is being illuminated with coherent light beams. Moreover, the inventors have proceeded with researches and succeeded in improvement in the projection apparatus to constantly prevent the generation of a region extremely bright in the region illuminated with coherent light beams when the light modulator is being illuminated with coherent light beams. Namely, the purpose of the present invention is to provide a projection apparatus and a hologram recording medium capable of making speckles inconspicuous, effectively suppressing the generation of brightness unevenness in a region illuminated with coherent light beams and enhancing light utilization efficiency.

In order to solve the problems above, according to an aspect of the present invention, there is provided a projection apparatus has:

a hologram recording medium configured to be capable of diffusing coherent light beams;

an irradiation unit configured to irradiate coherent light beams to the hologram recording medium so that the coherent light beams scan the hologram recording medium;

a light modulator that is illuminated by coherent light beams incident on and diffused at respective points of the hologram recording medium from the irradiation unit;

a projection optical system configured to project a modulated image generated by the light modulator onto a scattering plane; and an imaging optical system provided between the hologram recording medium and the light modulator, configured to converge the coherent light beams diffused at respective points of the hologram recording medium to illuminate the light modulator, wherein, the hologram recording medium records information of a first aperture stop and a second aperture stop arranged in order in a direction of the scattering plane from imaging optical system.

According to an aspect of the present invention, there is provided a projection control apparatus has:

a hologram recording medium configured to be capable of diffusing coherent light beams;

an irradiation control unit configured to guide coherent light beams to the hologram recording medium so that coherent light beams emitted from a light source scan the hologram recording medium;

a light modulator that is illuminated by coherent light beams incident on and diffused at respective points of the hologram recording medium from the irradiation control unit; and a projection optical system configured to project a modulated image generated by the light modulator onto a scattering plane, wherein, the hologram recording medium records information of a first aperture stop and a second aperture stop arranged in order in a direction of the scattering plane from imaging optical system.

According to the present invention, it is possible to effectively make speckles inconspicuous and effectively suppress the generation of unevenness of brightness in an illuminated region, and also to improve the light utilization efficiency.

DETAILED DESCRIPTION OF THE INVENTION

Hereinafter, embodiments of the present invention will be explained with reference to the drawings. In the accompanying drawings of the present description, in order to simplify the drawings and make understanding easy, the scale, the ratio of height to width, etc., are appropriately modified or enlarged.

Figure 1:
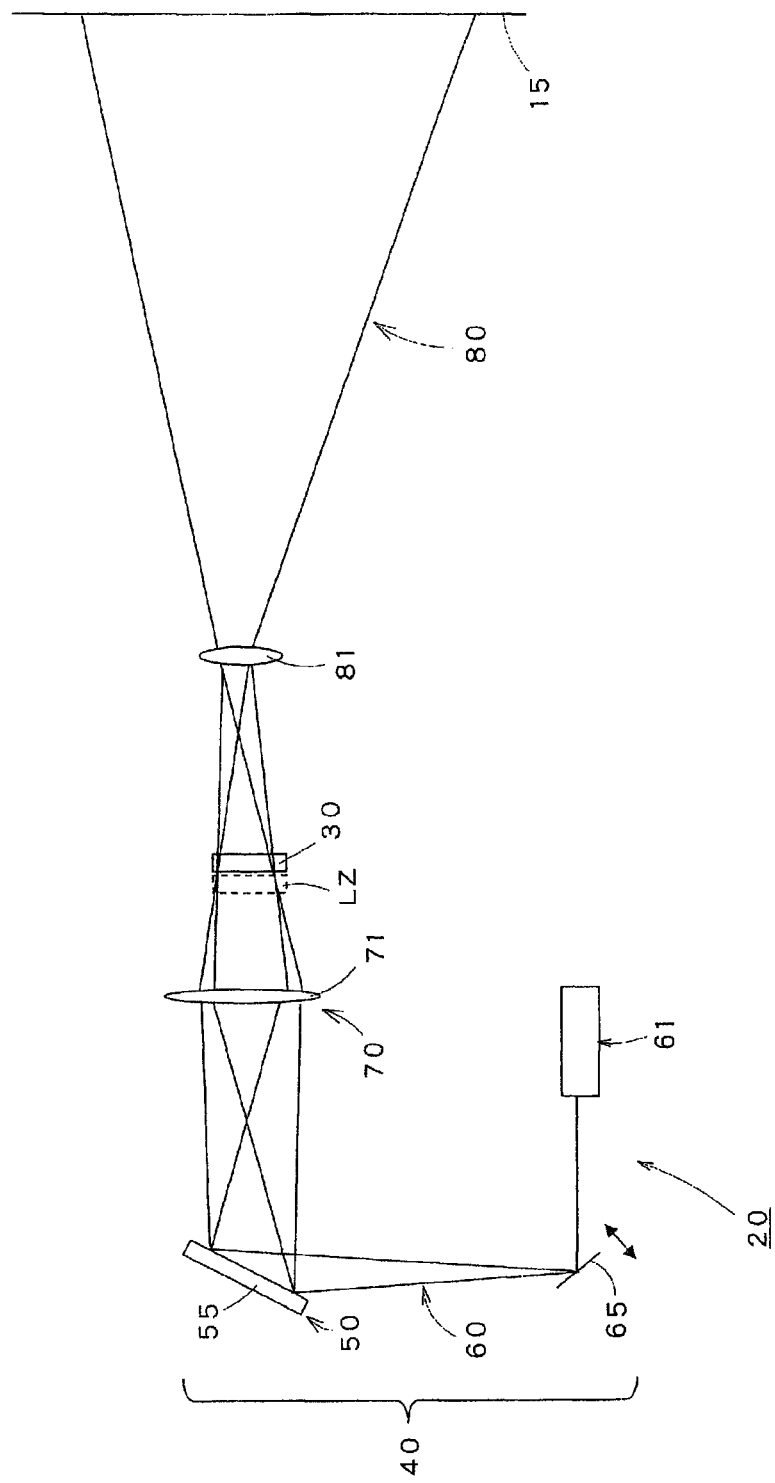
FIG. 1 is a view showing a schematic configuration of a projection apparatus 20 according to an embodiment of the present invention.

FIG. 1 is a block diagram schematically showing the configuration of a projection apparatus 20 according to an embodiment. The projection apparatus 20 of FIG. 1 is provided with an optical device 50, an irradiation unit 60, an imaging optical system 70, a light modulator 30, and a projection optical system 80. In this specification, a device that is a combination of the optical device 50 and the irradiation unit 60 is referred to as an illumination device 40.

The irradiation unit 60 irradiates the optical device 50 with coherent light beams so that the coherent light beams scan the surface of the optical device 50. The irradiation unit 60 has a laser source 61 that emits coherent light beams and a scanning device 65 that scans the surface of the optical device 50 with the coherent light beams emitted from the laser source 61. In this specification, the portion of the irradiation unit 60 from which the laser source 61 is removed is referred to as an irradiation control unit.

The optical device 50 has a hologram recording medium 55 that can reproduce an image of a first aperture stop in an illumination zone LZ that is provided to be overlapped with the light modulator 30. The details of the hologram recording medium 55 will be explained later. A coherent light beam reflected by the scanning device 65 is incident on the hologram recording medium 55. An interference fringe has been formed on the hologram recording medium 55. When a coherent light beam is incident, a coherent light beam diffracted by the interference fringe is emitted as diverging light, i.e. diffused light The scanning device 65 changes a reflection angle of incident coherent light beams to make reflected coherent light beams scan the hologram recording medium 55.

Coherent light beams incident on respective positions of the hologram recording medium 55 are incident on the imaging optical system 70 as diffused light. The imaging optical system 70 is provided between the hologram recording medium 55 and the spatial light modulator 30 to converge coherent light beams diffused by the hologram recording medium 55 and guide the convergent coherent light beams to the spatial light modulator 30. The imaging optical system 70 includes a field lens 71 that has a convex shape on both sides, a field lens 71 having a convex shape at the hologram recording medium 55 side but flat at the spatial light modulator 30 side, or the like.

By providing the imaging optical system 70 described above, coherent light beams diffused at arbitrary points on the hologram recording medium 55 become convergent light beam by the imaging optical system 70 and are incident on an illumination zone LZ provided at the position of the spatial light modulator 30. Accordingly, it is possible to illuminate the illumination zone LZ with almost all of coherent light beams diffused by the hologram recording medium 55 to enhance illumination intensity on the illumination zone LZ further.

As the spatial light modulator 30, a reflection-type microdisplay having a MEMS (Micro Electro Mechanical Systems) device such as a DMD (Digital Micromirror Device) can be used. In the apparatus disclosed in Japanese Patent Laid-Open No. 2008-224760 described above, a DMD is used as the spatial light modulator 30.

In addition, as the spatial light modulator 30, a transmission-type liquid crystal panel can be used. However, coherent light beams that pass through the imaging optical system 70 are not parallel beams, with different optical path lengths in the liquid crystal panel. Thus, contrast may be lowered depending on the beam incidence angle to the liquid crystal panel. For this reason, it is preferable to use a reflection-type microdisplay having a DMD or the like as the spatial light modulator 30 of the present embodiment.

It is preferable that the incidence plane of the spatial light modulator 30 is located at the same position as and has the same shape and size as the illumination zone LZ that is illuminated with coherent light beams by the illumination device 40. The reason is that coherent light beams from the illumination device 40 can be used for displaying an image on a diffuser screen 15 at high optical throughput efficiency.

The projection optical system 80 that projects a modulated image generated by the spatial light modulator 30 to the diffuser screen 15 has a projection lens 81 having, for example, a plurality of lenses. A modulated image generated by the spatial light modulator 30 is refracted by the projection lens 81 and projected onto the diffuser screen 15 as a modulated image. The size of a modulated image projected onto the diffuser screen 15 can be adjusted with the diameter of the projection lens 81, the distance between the projection lens 81 and the spatial light modulator 30, the distance between the projection lens 81 and the diffuser screen 15, etc. The diffuser screen 15 of FIG. 1 is a transmission type to diffuse a projected modulated image light. The diffuser screen 15 may be a reflection type.

Although omitted in FIG. 1, a modulated image diffused by the diffuser screen 15 may be incident on a half mirror not shown so that a portion of the modulated image diffused by the diffuser screen 15 is reflected by the half mirror to create a virtual image of the modulated image for an observer to visually recognize the virtual image with natural light through the half mirror. With this arrangement, a headup display apparatus can be realized. In this case, as the half mirror, for example, a vehicle front glass can be used. When an observer sits in the driver's seat and looks forward, the observer can visually recognize the virtual image while viewing scenes outside the vehicle. Or, instead of the half mirror, a hologram recording medium 55 or a prism may be used.

The spatial light modulator 30 can generate a variety of modulated images. By generating modulated images at the spatial light modulator 30 and illuminating the illumination zone LZ with the modulated images, a variety of modulated images can be projected onto the diffuser screen.

Figure 2:
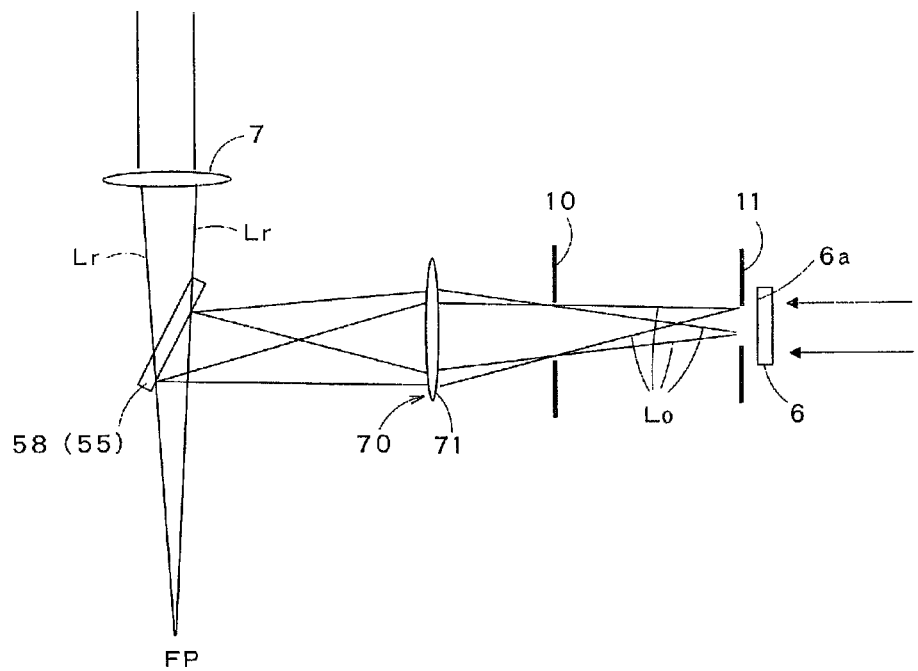
FIG. 2 is view explaining a state in which an image of a scattering plate 6 is generated on a hologram photosensitive material 58 as interference fringes.

In the present embodiment, in order to illuminate the illumination zone LZ, the optical device 50 including the hologram recording medium 55 is used. A hologram photosensitive material 58 to be a material of the hologram recording medium 55 is, for example, a reflection-type volume hologram using photopolymer. FIG. 2 is a view explaining a state in which images of first and second aperture stops 10 and 11 are generated on the hologram photosensitive material 58 as interference fringes.

As shown in FIG. 2, when forming images of the first and second aperture stops 10 and 11 as interference fringes on the hologram photosensitive material 58, the first aperture stop 10 is disposed at a position of the spatial light modulator 30, the second aperture stop 11 is disposed at a position of the entrance pupil of the projection optical system 80, and a scattering plate 6 or a light source is disposed at the diffuser screen 15 side not at the second aperture stop 11 side. Hereinbelow, an example of disposing the scattering plate 6 at the diffuser screen 15 side, not at the second aperture stop 11 side, will be explained.

Scattered light from the scattering plate 6 passes through the second aperture stop 11. The scattering plate 6 irradiates scattered light so that illumination intensity distribution of light from each point of the second aperture stop 11 becomes uniform on the entire region of the first aperture stop 10. As the method of measuring light illumination intensity distribution, for example, there are a method of directly measuring illumination intensity distribution on the first aperture stop 10 using a CCD sensor or the like, a method of measuring illumination intensity distribution by forming an image of the first aperture stop 10 on a CCD sensor or the like through lenses, a method of measuring illumination intensity distribution on a screen disposed on the first aperture stop 10, by a camera or the like, etc.

The diameter of the first aperture stop 10 is smaller than the diameter of the imaging optical system 70. This is because the imaging optical system 70 converges incident coherent light beams and guides the convergent coherent light beams to the first aperture stop 10. On the other hand, the size relationship between the diameters of the first and second aperture stops 10 and 11 can be arbitrary set. Nevertheless, by setting the diameter of the second aperture stop 11 smaller, the diameter of the projection optical system 80 disposed at the position of the second aperture stop 11 becomes smaller, thus realizing a compact projection optical system 80.

The shape of the first aperture stop 10 is the same as the shape of the spatial light modulator 30. If the spatial light modulator 30 is rectangular, the first aperture stop 10 is also rectangular. The size of the first aperture stop 10 is the same as or little bit larger than the size of the spatial light modulator 30. Thus, the first aperture stop 10 is a similar figure of the spatial light modulator 30. Having the first aperture stop 10 and the spatial light modulator 30 with the same size or both being almost a similar figure, and the first aperture stop 10 being disposed at the position of the spatial light modulator 30, illumination in accordance with the shape of the spatial light modulator 30 is possible to improve light utilization efficiency. This is because, since information of light passing through the first aperture stop 10 has only been recorded in the hologram recording medium 55, when reproducing the hologram recording medium 55 via the imaging optical system 70, the contour of a beam on the plane on which the first aperture stop 10 has originally been disposed becomes the shape of the first aperture stop 10.

The shape of the second aperture stop 11 is, for example, circular, but may be semicircular or rectangular. The size of the second aperture stop 11 is the same as or smaller than the region of the entrance pupil of the projection optical system 80. By restricting the size of the second aperture stop 11 to be the same as or smaller than the entrance pupil of the projection optical system 80, light can converge only on a necessary and sufficient region so that light can be efficiently incident on the projection optical system 80.

As shown in FIG. 2, the hologram recording medium 55 is produced using scattered light beams from an actual scattering plate 6 as object beams Lo. FIG. 2 shows a state in which a hologram photosensitive material 58 that shows photosensitivity to become the hologram recording medium 55 is exposed by reference beams Lr and object beams Lo, both being coherent light beams that show coherence to each other.

As for the reference beams Lr, for example, laser beams from the laser source 61 that oscillates laser beams in a specific wavelength range are used. The reference beams Lr pass through a condenser element 7 including lenses and are incident on the hologram photosensitive material 58. In the example shown in FIG. 2, laser beams to become the reference beams Lr are incident on the condenser element 7 as a parallel light flux that is parallel with the optical axis of the condenser element 7. By passing through the condenser element 7, the reference beams Lr are reshaped, i.e. converted, from a parallel light flux into a convergent light flux and incident on the hologram photosensitive material 58. On this occasion, a focal point FP of the convergent light flux Lr is located at a position beyond the hologram photosensitive material 58. In other words, the hologram photosensitive material 58 is located between the condenser element 7 and the focal point FP of the convergent light flux Lr collected by the condenser element 7.

Next, the object beams Lo are incident on the hologram photosensitive material 58 as scattered light from the scattering plate 6 made of opal glass, for example. In the example shown in FIG. 2, the hologram recording medium 55 to be produced is a reflection-type and the object beams Lo are incident on the hologram photosensitive material 58 on the opposite side of the reference beams Lr. It is a precondition that the object beams Lo are coherent with the reference beams Lr. Therefore, for example, it is possible to separate laser beams oscillated by the same laser source 61 and use one of the separated ones as the reference beams Lr and the other as the object beams Lo described above.

In the example shown in FIG. 2, a parallel light flux that is parallel with the direction of normal to the plate surface of the scattering plate 6 is incident on the scattering plate 6 and scattered, and then the scattered beams that have passed through the scattering plate 6 are incident on the hologram photosensitive material 58 as the object beams Lo via the imaging optical system 70 after passing through the second aperture stop 11 and the first aperture stop 10 in this order. According to this method, when an isotropic scattering plate 6 available at usually low cost is used as the scattering plate 6, the object beams Lo from the scattering plate 6 can be easily incident on the hologram photosensitive material 58 at roughly constant intensity distribution. Moreover, according to this method, although depending on the degree of scattering by the scattering plate 6, the object beams Lo can be easily incident on respective positions of the hologram photosensitive material 58 at roughly constant intensity from the entire region of a light-emitting surface 6a of the scattering plate 6.

As described above, when the hologram photosensitive material 58 is exposed by the reference beams Lr and object beams Lo, interference fringes caused by the interference between the reference beams Lr and object beams Lo are generated and interference fringes of these light beams are recorded in the hologram photosensitive material 58 as some form of pattern, i.e. an refractive index modulation pattern, as one example in a volume hologram. Thereafter, an appropriate posttreatment corresponding to the type of the hologram photosensitive material 58 is applied, thereby obtaining the hologram recording medium 55.

As described above, in the present embodiment, the scattered light (object beams) from the scattering plate 6 passes through the second aperture stop 11 and the first aperture stop 10 in this order and is guided to the hologram recording medium 55 via the imaging optical system 70. Therefore, information of the first and second aperture stops 10 and 11 can be recorded in the hologram recording medium 55. That is, since the scattering plate 6 generates scattered light so that illumination intensity distribution of light from each point of the second aperture stop 11 becomes uniform on the entire region of the first aperture stop 10, information of the first and second aperture stops 10 and 11 is stored in the hologram recording medium 55. Therefore, when the hologram recording medium 55 is reproduced, an image of the first aperture stop 10 on which scattered light form the scattering plate 6 is focused can be reproduced. This image becomes illumination light beams for the spatial light modulator 30.

Recording information of the first and second aperture stops 10 and 11 in the hologram recording medium 55 means recording information of light that passes through an aperture stop where nothing exists spatially. Thus, without causing the change of the recorded information due to dust, a scratch, etc., such as the above-described integrator rod, it is possible to easily and accurately record information on the hologram recording medium 55. Therefore, when the hologram recording medium 55 is reproduced, the spatial light modulator 30 can be illuminated with more uniform illumination intensity distribution to improve illumination quality.

Figure 3:
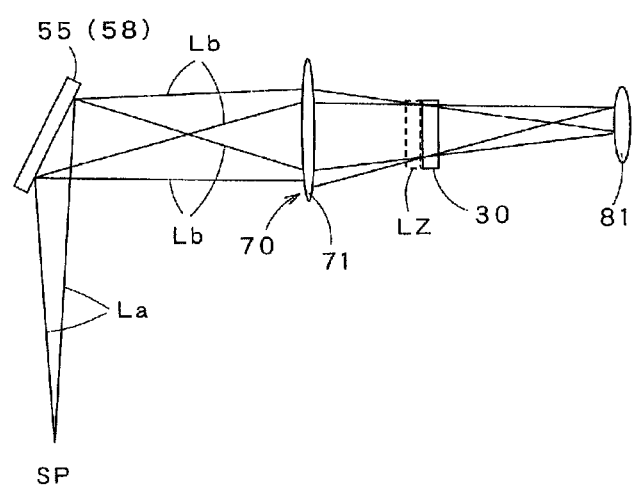
FIG. 3 is a view explaining a state in which an image of the scattering plate 6 is reproduced using interference fringes formed in a hologram recording medium 55 obtained through an exposure process of FIG. 2.

FIG. 3 is a view explaining a state in which an image of the scattering plate 6 is reproduced using interference fringes formed in the hologram recording medium 55 obtained through an exposure process of FIG. 2. As shown in FIG. 3, the hologram recording medium 55 produced with the hologram photosensitive material 58 of FIG. 2 meets its Bragg condition by means of light beams that have the same wavelength as the laser beams used in the exposure process and propagate in a reverse direction of the reference beams Lr along an optical path of the reference beams Lr. Namely, as shown in FIG. 3, a diverging light flux that diverges from a reference point SP located with respect to the hologram recording medium 55 so as to have the same positional relationship as the relative position of the focal point FP in FIG. 2 with respect to the hologram photosensitive material 58 in the exposure process and that has the same wavelength as the reference beams Lr in the exposure process is refracted by the hologram recording medium 55 as the reproduction illumination light beams La and, after converged by the imaging optical system 70, creates a reproduced image 5 of the first aperture stop 10 at a position of the spatial light modulator 30 corresponding to the first aperture stop 10.

In this occasion, the reproduction beams for creating the reproduced image 5 of the first aperture stop 10 i.e. beams Lb obtained by diffracting the reproduction illumination light beams La by the hologram recording medium 55 reproduces respective points of the illumination zone LZ disposed at a location that is the original place of the first aperture stop 10, as beams propagating in the reverse direction of the optical path of the object beams Lo propagated toward the hologram photosensitive material 58 from the scattering plate 6 in the exposure process.

As shown in FIG. 3, when reproducing the hologram recording medium 55, the spatial light modulator 30 is disposed at the position of the first aperture stop 10 and the projection optical system 80 is disposed at the position of the second aperture stop 11 in FIG. 2. The position of the first aperture stop 10 may be deviated from the position of the spatial light modulator 30 a little bit forward or backward in the optical-axis direction.

When recording the hologram recording medium 55, as shown in FIG. 2, each of the object beams Lo that have passed through the first aperture stop 10 diverges so as to be incident on the hologram photosensitive material 58. Namely, on respective points of the hologram photosensitive material 58, the object beams Lo from a light-emitting surface 6a of the scattering plate 6 are incident. As a result, information of light that was emitted from the entire light-emitting surface 6a and has passed through both of the second aperture stop 11 and the first aperture stop 10 is recorded at respective points of the hologram recording medium 55. It is therefore possible that beams that form a diverging light flux from the reference point SP and function as the reproduction illumination light beams La are incident on respective points of the hologram recording medium 55 to reproduce the images 5 of the scattering plate 5 having the same contour as one another at the same position of the light modulator 30, i.e. the illumination zone LZ, respectively.

Light diffused by the hologram recording medium 55 is converged by the imaging optical system 70 to propagate in the direction of the illumination zone LZ. Therefore, unnecessary scattered light can be effectively restricted. Accordingly, almost all of the reproduction illumination light beams La incident on the hologram recording medium 55 can be effectively used for illuminating the illumination zone LZ.

Next, the configuration of the irradiation unit 60 that emits coherent light beams to the optical device 50 made of the hologram recording medium 55 in which interference fringes are formed by the configuration such as shown in FIG. 2 will be explained. In the example shown in FIGS. 1 to 3, the irradiation unit 60 is provided with the laser source 61 that generates coherent light beams and the scanning device 65 that changes the propagation direction of coherent light beams from the laser source 61.

The laser source 61 may be a single color laser source or a plurality of laser sources of different emission colors, for example, red, green and blue. When a plurality of laser sources are used, the laser sources are arranged so that coherent light beams from the laser sources are emitted to a single point on the scanning device 65. With this arrangement, the hologram recording medium 55 is illuminated with reproduction illumination light beams having illumination colors of the laser sources 61 mixed with one another. In this case, coherent light beams from the laser sources are reflected by the scanning device 65 at reflection angles corresponding to the incidence angles of coherent light beams from the laser sources, incident on the hologram recording medium 55, diffracted by the hologram recording medium 55 separately, and superimposed on one another on the illumination zone LZ, thereby having a combined color. If the laser source 61 is configured with a plurality of laser sources of, for example, red, green and blue, the combined color is white. Or a scanning device 65 may be provided for each laser source.

For example, when illuminating with white, a color much closer to white may be reproduced by providing another laser source, for example, a laser source that emits light in yellow, other than red, green and blue. Therefore, there is no particular limitation on the type and the number of laser sources provided in the irradiation unit 60.

When creating a color modulated image, a variety of realization techniques are considered. When the light modulator 30 is configured with LCOS or the like equipped with a color filter for each pixel, by illuminating the illumination zone LZ with white light, it is possible to create a color modulated image at the light modulator 30.

Or it may be arranged that a light modulator 30 to generate a red modulated image, a light modulator 30 to generate a green modulated image, and a light modulator 30 to generate a blue modulated image are closely arranged and three illumination zones LZ to illuminate the three light modulators 30, respectively, are successively illuminated with diffused light from the hologram recording medium 55. With this arrangement, it is possible to combine three-color modulated images generated by the three light modulators 30 to create a color modulated image. Instead of such time division driving, three-color modulated images generated by three light modulators 30 simultaneously may be combined by using a prism or the like to create a color modulated image.

The projection optical system 80 described above is provided mainly for the purpose of projecting a modulated image of the light modulator 30 onto the diffuser screen 15. By providing the diffuser screen 15, speckles are superimposed on one another and averaged, and as a result, become inconspicuous.

The scanning device 65 changes the propagation direction of a coherent light beam with time to direct the coherent light beam in different directions so that the coherent light beam does not travel in the same direction. This results in that the coherent light beam, the propagation direction of which is changed by the scanning device 65, scans the incidence surface of the hologram recording medium 55 of the optical device 50.

Figure 4:
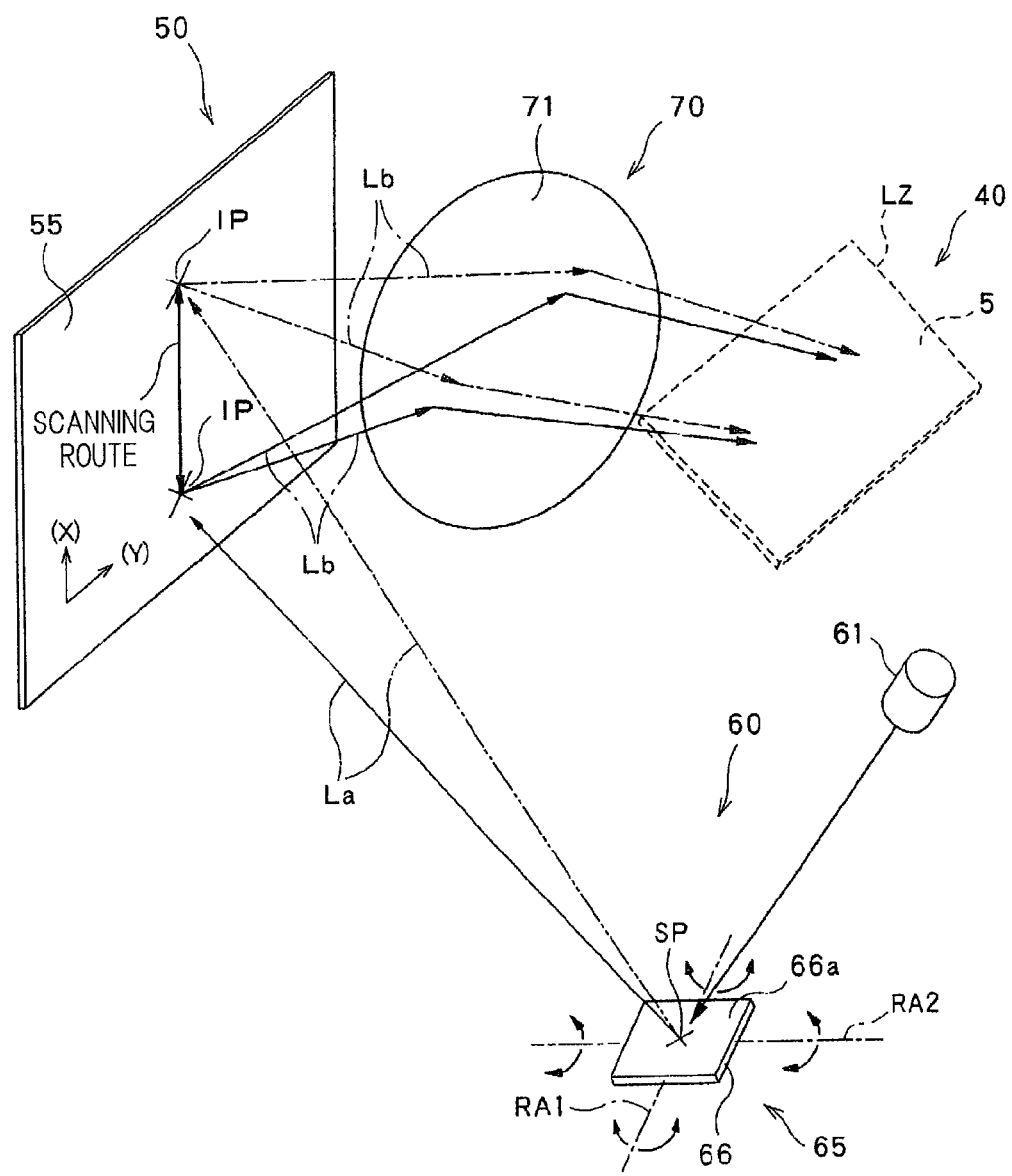
FIG. 4 is a view explaining a scanning route of a scanning device 65.

FIG. 4 is a view explaining a scanning route of the scanning device 65.

The scanning device 65 according to the present embodiment includes a reflection device 66 having a reflection surface 66a rotatable about one axis line RA1. The reflection device 66 has a mirror device that has a mirror as the reflection surface 66a rotatable about one axis line RA1. The reflection device 66 is configured to change the orientation of the mirror 66a to change the propagation direction of the coherent light beams from the laser source 61. In this occasion, as shown in FIG. 3, the mirror device 66 is provided so as to receive the coherent light beams from the laser source 61 roughly at the reference point SP.

A coherent light beam, for which final adjustments were made to its propagation direction by the mirror device 66, can be incident on the hologram recording medium 55 of the optical device 50 as a reproduction illumination light beam La that can become one beam included in a diverging light flux from the reference point SP in FIG. 3. As a result, coherent light beams from the irradiation unit 60 scan the hologram recording medium 55 and coherent light beams incident on respective positions of the hologram recording medium 55 reproduce images 5 of the scattering plate 6 having the same contour on the same location, i.e. the illumination zone LZ.

As shown in FIG. 4, the reflection device 66 is configured to rotate the mirror 66a about one axis line RA1. In the example shown in FIG. 4, the rotation axis line RA1 of the mirror 66a extends in parallel with the y-axis of the x-y axis unit, that is, the x-y axis unit having the x-y plane in parallel with the surface of the hologram recording medium 55, defined on the surface of the hologram recording medium 55. Then, the mirror 66a rotates about the axis line RA1 that is in parallel with the y-axis of the x-y axis unit defined on the surface of the hologram recording medium 55. Therefore, an incidence point IP of a coherent light beam from the irradiation unit 60 on the optical device 50 moves in a reciprocating motion in the direction parallel with the x-axis of the x-y axis unit defined on the surface of the hologram recording medium 55. Namely, in the example shown in FIG. 4, the irradiation unit 60 emits a coherent light beam to the optical device 50 to scan the hologram recording medium 55 along a straight route.

The scanning device 65 including the mirror device 66 and other components is, as described above, a member rotatable about at least the axis line RA1 and configured with a MEMS, for example. The scanning device 65 periodically moves in rotational motion, however, there is no particular limitation on its rotational frequency as far as it can scan with coherent light beams at about ⅓₀ seconds per one cycle for use, for example, in a liquid crystal display apparatus with which a human directly observes or at higher speed in accordance with the type of image to be displayed.

As a practical problem, the hologram photosensitive material 58 may shrink when the hologram recording medium 55 is produced. In such a case, it is preferable to adjust the incidence and emission angles of coherent light beams to be emitted to the optical device 50 from the irradiation unit 60 under consideration of the shrinkage of the hologram photosensitive material 58. Therefore, the wavelength of coherent light beams generated by the laser source 61 does not need to be precisely the same as the wavelength of the light beam used in the exposure process of FIG. 2 but may be roughly the same.

In a similar reason, even if the propagation direction of a light beam to be incident on the hologram recording medium 55 of the optical device 50 does not take precisely the same route as one beam included in a diverging light flux from the reference point SP, an image 5 can be reproduced in the illumination zone LZ. Actually, in the examples shown in FIGS. 3 and 4, the mirror, i.e. reflection plane 66a of the mirror device 66 of the scanning device 65 is inevitably displaced from its rotational axis line RA1. Therefore, when the mirror 66a is rotated about the rotational axis line RA1 that does not pass through the reference point SP, a light beam to be incident on the hologram recording medium 55 may not be one of the beams that form a diverging light flux from the reference point SP. However, practically, an image 5 can be substantially reproduced in a manner that the image 5 is substantially reproduced on the illumination zone LZ by means of coherent lights from the irradiation unit 60 having the shown configuration.

The scanning device 65 may not necessarily be a device for reflecting coherent light beams but may be a device for refracting or diffracting coherent light beams so that coherent light beams scan the optical device 50.

Effects of Present Embodiment

Next, the functions of the projection apparatus 20 having the configuration described above will be explained.

In the projection apparatus 20 according to the present embodiment, the scanning device 65 scans the hologram recording medium 55 with coherent light beams, and coherent light beams diffused by the hologram recording medium 55 are incident on the imaging optical system 70 to be changed to convergent light to illuminate the illumination zone LZ. Accordingly, among the coherent light beams diffused by the hologram recording medium 55, a ratio of coherent light beams that are not used for illumination of the illumination zone LZ is lowered to improve illumination intensity on the illumination zone LZ.

When recording the hologram recording medium 55, the first aperture stop 10 is disposed at the position of the spatial light modulator 30, the second aperture stop 11 is disposed at the position of the entrance pupil of the imaging optical system 70, and the scattering plate 6 is disposed at the screen side not at the second aperture stop 11 side. Scattered light (object light beams) from the scattering plate 6 is incident on the second aperture stop 11 so that object light beams from the respective points of the second aperture stop 11 illuminate the entire region of the first aperture stop 10. The object light beams that have passed through the first aperture stop 10 are incident on the hologram photosensitive material 58 via the imaging optical system 70. Accordingly, information of the first and second aperture stops 10 and 11 can be recorded in the hologram recording medium 55.

When irradiating reproduction light beams to the hologram recording medium 55, coherent light beams diffused by the hologram recording medium 55 are converged by the imaging optical system 70 to illuminate the entire region of the spatial light modulator 30 disposed at the position (illumination zone) of the first aperture stop 10. This illumination is to reproduce an image of the first aperture stop 10, not an image of the scattering plate 6. Namely, in the present embodiment, an image of an actual object in the optical system is not reproduced with the hologram recording medium 55, but information of light beams that have passed through the first aperture stop 10 among light beams irradiated from the scattering plate 6 is reproduced. Therefore, a high-quality projected image can be obtained with no effects of, such as, dust, a scratch, etc., on the rod end face of the conventional integrator-rod system.

Moreover, according to the present embodiment, all of the coherent light beams modulated by the spatial light modulator 30 can pass through the second aperture stop 11 to improve light utilization efficiency.

Moreover, by making smaller the diameter of the second aperture stop 11, a compact projection optical system 80 with a small diameter can be realized.

Furthermore, in the present embodiment, the position of the hologram recording medium 55 is not restricted by the focal point of the imaging optical system 70 or the like. This is because, for example, by disposing the hologram recording medium 55 at a position at which the hologram recording medium 55 is to be disposed in reproduction, original light information can be reproduced, thereby a higher design freedom being realized.

As described above, in the present embodiment, a modulated image is generated by using the scanning device 65, the optical device 50 including the hologram recording medium 55, and the light modulator 30. Therefore, compared to generate a modulated image by using, for example, an ordinary liquid crystal display apparatus, the hardware configuration up to the generation of a modulated image can be drastically made compact. Moreover, in the present embodiment, the scanning device 65 scans the hologram recording medium 55 with coherent light beams and a modulated image is projected onto the diffuser screen 15. Therefore, even though using coherent light beams, it is possible to make speckles inconspicuous, thus realizing the projection apparatus 20 capable of displaying high-quality images. Moreover, by providing the diffuser screen 15, it is possible to widen the viewing angle.

On respective positions on the hologram recording medium 55, the scanning device 65 makes the corresponding coherent light beams of specific wavelength incident at an incidence angle that meets the Bragg condition on the respective positions. As a result, the coherent light beams incident on the specific positions illuminate the entire region of the illumination zone LZ in a superimposed manner by diffraction caused by interference fringes recorded in the hologram recording medium 55. Namely, the coherent light beams incident on specific positions of the hologram recording medium 55 are diffused, i.e. spread, by the optical device 50 to be incident on the entire region of the illumination zone LZ.

In this way, the projection apparatus 60 illuminates the illumination zone LZ with coherent light beams. For example, when the laser source 61 has a plurality of laser sources 61 that emit laser beams at different colors, information of light of each color that has passed through the first aperture stop 10 is reproduced in the illumination zone LZ. Therefore, when these laser sources emit laser beams simultaneously, the illumination zone LZ is illuminated with white that is a mixture of three colors.

In the present embodiment, an optical image can be created on the illumination zone LZ with speckles inconspicuous, as explained below.

According to Speckle Phenomena in Optics, Joseph W. Goodman, Roberts & Co., 2006 cited above, it is effective to integrate parameters such as polarization, phase, angle and time to increase modes. The modes here are speckle patterns with no correlation to one another. For example, in the case where coherent light beams are projected onto the same screen in different directions from a plurality of laser sources, modes exist in the same number as the laser sources. Moreover, in the case where coherent light beams are projected onto a screen in different directions intermittently from the same laser source, modes exist by the number of changes in the incidence direction of the coherent light beams during the time that is not covered by the resolution of human eyes. It is assumed that, in the case where there are these modes, the interference patterns of light are superimposed and averaged with no correlation, and as a result, speckles observed by eyes of an observer are inconspicuous.

In the projection apparatus 60 described above, coherent light beams are emitted to the optical device 50 to scan the hologram recording medium 55. Although coherent light beams incident on respective locations of the hologram recording medium 55 illuminate the entire region of the illumination zone LZ, the illuminating direction of the coherent light beams to illuminate the illumination zone LZ are different from one another. And, since the position on the hologram recording medium 55 on which a coherent light beam is incident changes with time, the incidence direction of the coherent light beam on the illumination zone LZ also changes with time.

As described above, in the present embodiment, a coherent light beam continuously scans the hologram recording medium 55. Following to this, the incidence direction of a coherent light beam to the illumination zone LZ from the projection apparatus 60 via the optical device 50 also continuously changes. When the incidence direction of a coherent light beam to the illumination zone LZ from the optical device 50 changes slightly, for example, an angle less than 1°, a speckle pattern generated on the illumination zone LZ changes greatly, resulting in superimposition of speckle patterns with no correlation. In addition, the frequency of a scanning device 65 such as a MEMS mirror and a polygonal mirror actually on the market is usually several hundred Hz or higher and a scanning device 65 of frequency reaching several ten thousands Hz is not rare.

Accordingly, according to the present embodiment described above, the incidence direction of a coherent light beam changes with time at each position of the illumination zone LZ and this change occurs at a speed that is not covered by the resolution of human eyes. Therefore, if a screen is provided at the illumination zone LZ, speckles generated corresponding to respective incidence angles are superimposed on one another and averaged to be observed by an observer. Accordingly, speckles become inconspicuous effectively to an observer who observes an image displayed on the screen. In the case of the present embodiment, the spatial light modulator 30 is provided so as to be overlapped with the illumination zone LZ for projection from the spatial light modulator 30 to the diffuser screen 15 via the projection optical system 80. The advantage mentioned above is also applied to this case. That is, speckles generated on the diffuser screen 15 are superimposed on one another and averaged. Therefore, the speckles generated on the diffuser screen 15 become inconspicuous.

As described above, in the present embodiment, the illumination device 40 can be realized with an extremely simple configuration in which the scanning device 65 scans the hologram recording medium 55 with coherent light beams and coherent light beams diffracted by the hologram recording medium 55 are incident on the entire region of the illumination zone LZ.

Other Features of Present Embodiment

In Speckle Phenomena in Optics, Joseph W. Goodman, Roberts & Co., 2006 mentioned above, a method using a numerical value corresponding to a speckle contrast (% in unit) as a parameter to indicate the degree of speckles generated on a screen is proposed. The speckle contrast is the quantity defined as a value obtained by dividing the standard deviation of variation in intensity actually occurred on a screen by an average value of the intensity when a test-pattern image to originally show uniform intensity distribution is displayed. A larger value of the speckle contrast means a larger degree of generation of speckles on a screen and indicates to an observer that a spotted luminance-unevenness pattern is more remarkable.

In addition, according to the present embodiment described above, the following advantages can be obtained.

According to the present embodiment described above, the optical device 50 for making speckles inconspicuous can also function as an optical member for shaping and adjusting the beam shape of a coherent light beam emitted from the irradiation unit 60. Therefore, it is possible to miniaturize and simplify the optical system.

Moreover, according to the present embodiment described above, coherent light beams incident on respective positions of the hologram recording medium 55 create light of respective colors that have passed through the first aperture stop 10 on the entire region of the illumination zone LZ. Therefore, it is possible to utilize all of the light beams diffracted by the hologram recording medium 55 for illumination, thus improving utilization efficiency of light beams from the laser source 61.

(Avoidance of Zero-Order Light)

Part of coherent light beams from the irradiation unit 60 is not diffracted by the hologram recording medium 55 but passes through the hologram recording medium 55. This type of light is called zero-order light. When zero-order light is incident on the illumination zone LZ, an abnormal region, i.e. a spotted region, a line region, and a plane region, inevitably appears in which brightness, i.e. intensity, is rapidly increased compared with the surroundings.

When a reflection-type volume hologram recording medium 55, hereinafter, "a reflection-type volume hologram", is used, the illumination zone LZ is not provided in a propagation direction of zero-order light, hence it is relatively easy to avoid zero-order light. When a transmission-type hologram recording medium 55, hereinafter, "a transmission-type volume hologram" is used, zero-order light can be separated by selecting a recording angle so that incident light and emitted light do not interfere with each other. If an optical path of zero-order light and an optical path of first-order light cannot be separated due to the arrangement, it is desirable to raise a diffraction efficiency as much as possible to restrict the influence of zero-order light as much as possible.

(Reflection- and Transmission-type Hologram Recording Media 55)

Reflection-type holograms show higher wavelength selectivity than transmission-type holograms. In other words, in reflection-type holograms, although interference fringes corresponding to different wavelengths are superimposed one another in layers, a coherent light beam having a desired wavelength can be diffracted by a desired layer only. In addition, reflection-type holograms are excellent in that the influence of zero-order light can be easily removed.

On the other hand, although transmission-type holograms have a wide spectrum range for diffraction and a high acceptable level to the laser source 61, if interference fringes corresponding to different wavelengths are superimposed one another in layers, layers other than a desired layer also diffract coherent light of a desired wavelength. Therefore, in general, it is difficult to configure transmission-type holograms in a layered structure.

(Irradiation Unit 60)

Figure 5:
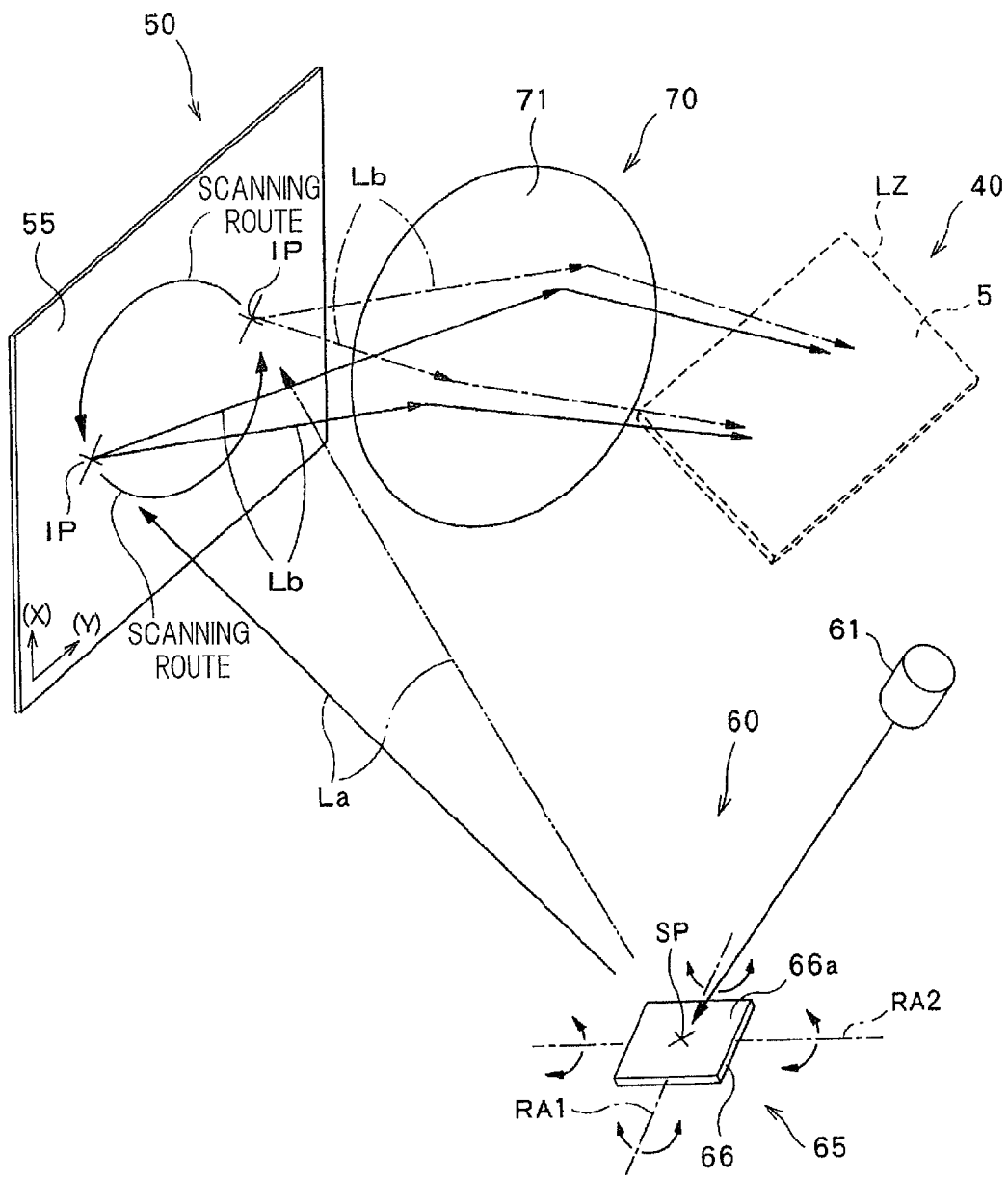
FIG. 5 is a view showing an example of rotating a mirror device 66 in a two-axis direction.

The embodiments described above show an example in which the irradiation unit 60 includes the laser source 61 and the scanning device 65. The scanning device 65 includes, for example, the one-axis-rotation type mirror device 66 that changes the propagation direction of a coherent light beam by reflection. However, the scanning device 65 is not limited thereto. As shown in FIG. 5, the scanning device 65 may be configured so that the mirror, i.e. reflection plane 66a, of the mirror device 66 can rotate about a first rotation axis line RA1 as well as about a second rotation axis line RA2 intersecting the first rotation axis line RA1. In the example shown in FIG. 5, the second rotation axis line RA2 of the mirror 66a is perpendicular to the first rotation axis line RA1 which is extended in parallel to the Y axis of the XY coordinate system defined on the plate plane of the hologram recording medium 55. Then, since the mirror 66a can rotate about both of the first axis line RA1 and the second axis line RA2, the incidence point IP of a coherent light beam of the irradiation unit 60 incident on the optical device 50 can be shifted on the plate plane of the hologram recording medium 55 in two-dimensional directions. Therefore, as an example, as shown in FIG. 5, the incidence point IP of a coherent light beam incident on the optical device 50 can be shifted along a circumference.

Moreover, the scanning device 65 may include two or more mirror devices 66. In this case, although the mirror 66a of the mirror device 66 can rotate about only a single axis line, the incidence point IP of a coherent light beam from the irradiation unit 60 incident on the optical device 50 can be shifted on the plate plane of the hologram recording medium 55 in two-dimensional directions.

As a concrete example of the mirror device 66a included in the scanning device 65, there are a MEMS mirror, a polygonal mirror, a galvano scanner, etc.

Moreover, the scanning device 65 may be configured to include other devices other than a reflection device, for example, the mirror device 66 described above, which changes the propagation direction of a coherent light beam by reflection. For example, the scan device 65 may include a refraction prism, a lens, etc.

Essentially, the scanning device 65 is not a necessary component. The light source 61 of the irradiation unit 60 may be configured so that they can be displaced, i.e. moved, oscillated, and rotated, with respect to the optical device 50. Coherent light beams emitted from the light source 61 may scan the hologram recording medium 55 in accordance with the displacement of the light source 61 with respect to the optical device 50.

Moreover, although the description hereinbefore is made on condition that the light sources 61 of the irradiation device 60 oscillate a laser beam shaped into a line beam, the preset invention is not limited thereto. Particularly, in the embodiments described above, coherent light beams emitted to respective positions of the optical device 50 are shaped by the optical device 50 into a light flux which is incident on the entire region of the illumination region LZ. Therefore, no problem occurs even if coherent light beams emitted from the light sources 61 of the irradiation device 60 to the optical device 50 are not accurately shaped. For this reason, coherent light beams generated from the light sources 61 may be diverging light. In addition, the shape of coherent light beams, in cross section, generated from the light sources 61 may be an ellipse or the like instead of a circle. In addition, the transverse mode of coherent light beams generated from the light sources 61 may be a multi-mode.

In addition, when the light source 61 generates a diverging light flux, coherent light beams are incident on the hologram recording medium 55 of the optical device 50 not on a spot but on a region having a certain area. In this case, light beams which are diffracted by the hologram recording medium 55 and incident on respective positions of the illumination region LZ are angle-multiplexed. In other words, in each instant, on respective positions of the illumination region LZ, coherent light beams are incident from directions within a certain angle range. Due to the angle-multiplexing, it is possible to more effectively make speckles inconspicuous.

Moreover, in FIG. 1, an example is shown in which coherent light beams reflected by the scanning device 65 are directly incident on the optical device 50. However, a condenser lens may be provided between the scanning device 65 and the optical device 50 to convert coherent light beams into a parallel light flux that is incident on the optical device 50. In this kind of example, instead of a converging light flux described above, a parallel light flux is used as the reference light beam Lr in the exposure process in the production of the hologram recording medium 55. The hologram recording medium 55 described above can be more simply produced and replicated.

(Optical Device)

In the embodiments described above, although the example in which the optical device 50 is configured with a reflection-type volume hologram recording medium 55 using photopolymer has been described, the present invention is not limited thereto. Moreover, the optical device 50 may include a volume hologram recording medium that is a type in which recording is performed by using a photosensitive medium including a silver halide material. Moreover, the optical device 50 may include a transmission-type volume hologram recording medium 55 or a relief-type, i.e. emboss-type hologram recording medium 55.

With respect to the relief-type, i.e. emboss-type, hologram recording medium, a hologram interference fringe is recorded using a convex-concave structure of the surface thereof. However, in the case of the relief-type hologram recording medium, scattering due to the convex-concave structure of the surface may also cause generation of undesirable new speckles, hence in this respect, the volume hologram recording medium is preferable. In the case of the volume hologram recording medium, a hologram interference fringe is recorded as a refractive index modulation pattern, i.e. refractive index distribution, of an inner portion of the medium, hence there is no influence of scattering because of the convex-concave structure of the surface.

However, even when the volume hologram recording medium is used, a type in which recording is performed using a photosensitive medium including a silver halide material may become a cause of loss of light amount and also generating new speckles due to scattering of silver halide particles. In this respect, the volume hologram recording medium using a photopolymer is preferable as the hologram recording medium 55.

Moreover, in the recording process shown in FIG. 2, although a so-called Fresnel-type hologram recording medium 55 is produced, a Fourier transform-type hologram recording medium 55 which can be obtained through recording using lenses may be produced. When the Fourier transform-type hologram recording medium 55 is used, lenses can also be used for image reproduction.

In addition, a striped pattern, i.e. refractive index modulation pattern or convex-concave pattern, which is to be formed on the hologram recording medium 55 may be designed by using a computer based on a planned wavelength or incidence direction of a reproduction illumination light beam La, a shape or position of an image to be reproduced, and the like, without use of an actual object light beam Lo and reference light beam Lr. The hologram recording medium 55 obtained in this manner is also called a computer generated hologram recording medium. Moreover, when a plurality of coherent light beams having mutually different wavelength ranges are emitted from the irradiation unit 60 in a similar manner in the modification described above, the hologram recording medium 55 as a computer generated hologram recording medium may be partitioned two-dimensionally into a plurality of regions provided corresponding to coherent light beams of respective wavelength ranges so that the coherent light beams of the respective wavelength ranges are diffracted in the corresponding regions to reproduce images.

(Illuminating Method)

In the embodiments described above, an example is shown in which the irradiation unit 60 is configured to be able to scan the optical device 50 in a one-dimensional direction with coherent light beams and the hologram recording medium 55 of the optical device 50 is configured to diffuse the coherent light beams incident on respective positions of the hologram recording medium 55 in a two-dimensional direction, so that the illumination device 40 illuminates the two-dimensional illumination region LZ. However, as described above, the present invention is not limited to such example. For example, the irradiation unit 60 may be configured to be able to scan the optical device 50 in a two dimensional direction with coherent light beams and the hologram recording medium 55 of the optical device 50 may be configured to diffuse the coherent light beams incident on respective positions of the hologram recording medium 55 in a two-dimensional direction, so that the illumination device 40 illuminates the two-dimensional illumination region LZ, as shown in FIG. 5.

Moreover, as already described, the irradiation unit 60 may be configured to be able to scan the optical device 50 in a one-dimensional direction with coherent light beams and the hologram recording medium 55 of the optical device 50 may be configured to diffuse the coherent light beams incident on respective positions of the hologram recording medium 55 in a one-dimensional direction, so that the illumination device 40 illuminates the one-dimensional illumination region LZ. In this configuration, the scanning direction of a coherent light beam from the irradiation unit 60 and the diffusing direction by the hologram recording medium 55 of the optical device may be parallel with each other.

Furthermore, the irradiation unit 60 may be configured to be able to scan the optical device 50 in a one- or two-dimensional direction with coherent light beams and the hologram recording medium 55 of the optical device 50 may be configured to diffuse the coherent light beams incident on respective positions of the hologram recording medium 55 in a one-dimensional direction. In this configuration, as already described, the optical device 50 may have a plurality of hologram recording media 55 to illuminate illumination zones LZ corresponding to the hologram recording media 55 successively, so that illumination device 40 illuminates a two-dimensional region. In this occasion, the illumination zones LZ may be successively illuminated at a speed felt like as if simultaneously illuminated for human eyes or at a low speed so that human eyes can recognize that the illumination zones LZ are successively illuminated.

In this specification, an apparatus that is a combination of the optical device 50, the scanning device 65 in the irradiation unit 60, and the imaging optical system 70 is referred to as a projection control apparatus 90.

The present invention is not limited to the embodiments described above but includes various modifications conceivable by those skilled in the art. The effects of the present invention are also not limited to those described above. Namely, various additions, modifications and partial omissions may be made without departing from the conceptual idea and gist of present invention derived from those defined in the accompanying claims and their equivalents.

What is claimed is:

1. A projection apparatus comprising:
   a hologram recording medium configured to be capable of diffusing coherent light beams;
   an irradiation unit configured to irradiate coherent light beams to the hologram recording medium so that the coherent light beams scan the hologram recording medium;
   a light modulator that is illuminated by coherent light beams incident on and diffused at respective points of the hologram recording medium from the irradiation unit;
   a projection optical system configured to project a modulated image generated by the light modulator onto a scattering plane; and
   an imaging optical system provided between the hologram recording medium and the light modulator, configured to converge the coherent light beams diffused at respective points of the hologram recording medium to illuminate the light modulator,
   wherein, when a first aperture stop and a second aperture stop are arranged in order in a direction of a scattering plane from the imaging optical system, and coherent light beams are irradiated on the second aperture from a direction of the scattering plane, the hologram recording medium records information of the coherent light beams after passing through the first aperture stop and the second aperture stop.

2. The projection apparatus of claim 1, wherein the hologram recording medium is recorded by using a light source or a scattering member having scattering characteristics by which light illumination intensity distribution from respective points of the second aperture stop becomes uniform on an entire region of the first aperture stop.

3. The projection apparatus of claim 1, wherein the first aperture stop is disposed at a position of the light modulator and the second aperture stop is disposed at an entrance pupil of the projection optical system.

4. The projection apparatus of claim 1, wherein a shape of the first aperture stop and a shape of the spatial light modulator are similar figures.

5. The projection apparatus of claim 1, wherein the second aperture stop is identical to a region of an entrance pupil of the projection optical system or part of the region of the entrance pupil.

6. The projection apparatus of claim 1, wherein the hologram recording medium is a volume hologram.

7. The projection apparatus of claim 1, wherein the hologram recording medium is a computer generated hologram.

8. The projection apparatus of claim 1, wherein the hologram recording medium is a surface relief-type hologram recording medium.

9. The projection apparatus of claim 1, wherein the light modulator is a spatial light modulator.

10. The projection apparatus of claim 9, wherein the spatial light modulator generates a modulated image by making coherent light beams from the irradiation unit pass therethrough or reflecting the coherent light beams from the irradiation unit.

11. The projection apparatus of claim 9, wherein the spatial light modulator is a micro display having a reflective-type micromirror device.

12. The projection apparatus of claim 1 wherein the irradiation unit comprises:
   a light source configured to emit coherent light beams; and
   a scanning device configured to change a propagation direction of the coherent light beams emitted from the light source to make the coherent light beams scan the hologram recording medium.

13. A projection apparatus comprising:
   a hologram recording medium configured to be capable of diffusing coherent light beams;
   an irradiation control unit configured to guide coherent light beams to the hologram recording medium so that coherent light beams emitted from a light source scan the hologram recording medium;

a light modulator that is illuminated by coherent light beams incident on and diffused at respective points of the hologram recording medium from the irradiation control unit; and a projection optical system configured to project a modulated image generated by the light modulator onto a scattering plane, wherein, when a first aperture stop and a second aperture stop are arranged in order in a direction of a scattering plane from the imaging optical system, and coherent light beams are irradiated on the second aperture from a direction of the scattering plane, the hologram recording medium records information of the coherent light beams after passing through the first aperture stop and the second aperture stop.

14. A hologram recording medium comprising a recording area to be scanned by coherent light beams irradiated from an irradiation unit and configured to diffuse the coherent light beams on the recording area and guide the diffused coherent light beams to a light modulator, wherein, when a first aperture stop and a second aperture stop are arranged in order in a direction of a scattering plane from the imaging optical system, and coherent light beams are irradiated on the second aperture from a direction of the scattering plane, the recording area records information of the coherent light beams after passing through the first aperture stop and the second aperture stop arranged in order from a projection optical system configured to project a modulated image generated by the light modulator onto a scattering plane in a direction of the scattering plane.

* * * * *